(12) United States Patent
Westin

(10) Patent No.: US 7,700,037 B2
(45) Date of Patent: Apr. 20, 2010

(54) MARTENSITIC CHROMIUM-NITROGEN STEEL AND ITS USE

(75) Inventor: Leif Westin, Söderfors (SE)

(73) Assignee: Erasteel Kloster Aktiebolag, Soderfors (SE)

( * ) Notice: Subject to any disclaimer, the term of this patent is extended or adjusted under 35 U.S.C. 154(b) by 440 days.

(21) Appl. No.: 10/581,607

(22) PCT Filed: Dec. 6, 2004

(86) PCT No.: PCT/SE2004/001815

§ 371 (c)(1),
(2), (4) Date: Jul. 14, 2006

(87) PCT Pub. No.: WO2005/054531

PCT Pub. Date: Jun. 16, 2005

(65) Prior Publication Data

US 2007/0023107 A1    Feb. 1, 2007

(30) Foreign Application Priority Data

Dec. 5, 2003    (SE) ................................... 0303289

(51) Int. Cl.
*C22C 38/00*    (2006.01)

(52) U.S. Cl. ......................................... 420/66; 420/128

(58) Field of Classification Search ................. 148/325, 148/326; 420/65, 66, 67, 69
See application file for complete search history.

(56) References Cited

U.S. PATENT DOCUMENTS

| 3,563,813 | A | * | 2/1971 | Webster ....................... 148/578 |
| 6,673,165 | B2 |   | 1/2004 | Koga et al. |
| 2002/0164260 | A1 | * | 11/2002 | Koga et al. ..................... 420/61 |

FOREIGN PATENT DOCUMENTS

| DE | 3901 470 C1 |   | 8/1990 |
| DE | 4212966 | * | 10/1993 |
| DE | 42 32 695 A1 |   | 3/1994 |
| EP | 0 810 294 A1 |   | 12/1997 |
| EP | 1 236 809 A2 |   | 9/2002 |

OTHER PUBLICATIONS

Goecmen et al., "Precipitation Behaviour and Stability of Nitrides in High Nitrogen Martensitic 9% and 12% Chromium Steels," ISIJ International, vol. 36, No. 7, 1996, pp. 768-776.*

* cited by examiner

*Primary Examiner*—Scott Kastler
*Assistant Examiner*—Vanessa Velasquez
(74) *Attorney, Agent, or Firm*—Nixon & Vanderhye

(57) ABSTRACT

A steel material having a good resistance to corrosion, consisting of an alloy containing in % by weight: max 0.12 C 0.5-1.5 N 12-18 Cr max 0.5 Mn max 0.5 Ni 1-5 (Mo+W/2) max 1.5 (V+Nb/2+Ti) 0.1-0.5 Si from traces and up to max 2.0 Co from traces and up to max 0.1 S balance iron and essentially only impurities at normal contents.

28 Claims, 3 Drawing Sheets

MARTENSITIC CHROMIUM-NITROGEN STEEL AND ITS USE

This application is the U.S. National Phase of International Application PCT/SE2004/001815, filed 6 Dec. 2004, which designated the U.S. PCT/SE2004/001815 claims priority to Swedish Application No. 0303289-3 filed 5 Dec. 2003. The entire content of these applications are incorporated herein by reference.

TECHNICAL FIELD

The invention relates to a steel material intended to be used for knives and tools, the use of which requires a high hardness combined with a good corrosion resistance. The invention relates in particular to a steel material that also has a good abrasive durability, in the hardened and tempered condition of the steel. The invention also relates to use of the steel material for knives and tools, in particular machine knives and manual knives within food industry, such as chopping knives for cutting up and chopping slaughtered animals and frozen fish, tools for mincing meat and removing the rind, vibrator and circular knives for cutting machines. Other fields of use are machine knives within pharmaceutical industry and knives for cutting wet soft crepe paper. Yet other conceivable applications are plastics moulding tools and injection screws for plastics, tools for cutting paper based laminated packaging products for food and beverages. Another conceivable field of application is as a material for ball bearings.

BACKGROUND OF THE INVENTION

Within food industry, high demands are put on corrosion resistance and hardness for tools that are used. Kitchen tools are often exposed to pit corrosion as they get in contact with chloride-containing water. High demands are also put on abrasive wear resistance for such tools. Amongst known materials having these properties, mention can be made of a group of nitrified martensite steels, the composition and properties of which are disclosed in DE 3901 470 C1. In the present patent application, these steels are collectively denoted A.

Another related commercial steel corresponds to the composition of Werkstoff No. 1.41 23 and is denoted B.

From EP 0 810 294 it is furthermore known a number of alloy compositions having good corrosion properties, high strength and good ductility. These steels are collectively denoted C.

Yet another material having good corrosion resistance is disclosed in EP 1 236 809 and is denoted D.

The composition of the above mentioned materials is shown in the table below.

It is in common for the four steels above that they have good corrosion properties but lack adequate hardness and wear resistance, at least within certain of the above mentioned fields of application. Steels no. 1 and 2 reach a hardness within the range 57-59 HRC.

ACCOUNT OF THE INVENTION

The object of the invention is to offer a steel material having an optimal property profile for the above mentioned fields of application. Accordingly, the steel material should primarily fulfil some or all of the following criteria:

Excellent corrosion resistance, particularly a good resistance to pit corrosion as the material is used for knives and tools, especially machine knives and manual knives within food industry as well as when used for plastic moulding tools and injection screws for plastics, and tools for cutting paper based packaging laminates for food and beverages. Another conceivable field of application is for ball bearings.

A high hardness in its hardened condition, in order not to be deformed at high mechanical stress. A hardness of 58-65 HRC, preferably 60-64 HRC and most preferred about 62-63 HRC, in its hardened and tempered condition.

A high toughness (strength) in order to be suited as steel for knives and other applications putting high demands on flexibility and high edge sharpness.

Adequate wear resistance for said fields of use, e.g. a wear resistance comparable to the one of steels of the type AISI 440C, AISI 618, 19C27, 13C26, 12C27, W 1.4034 or similar.

A hardness of 230-240 HB in soft annealed condition.

Other desired parameters are:
A good workability
A good dimensional stability
A high fatigue resistance
A good ductility/toughness
A good compression strength
A versatility that makes the steel useful for several different fields of application.

The invention is characterised by what is given in the enclosed claims, in order to achieve the desirable properties.

Considering the individual alloying materials, the following applies.

Carbon may exist in the steel in a comparatively low amount, in order to avoid precipitation of chromium carbides in the grain boundaries. It is known that grain boundary carbides result in an increased risk of intercrystalline corrosion, so called intergranular corrosion. From this aspect, it is therefore desirable that the carbon content is kept as low as possible. From this aspect, carbon is in principle not desired at all in the steel, but a carbon content of up to about 0.12% can be allowed without appreciable deterioration of the material's ability to withstand intergranular corrosion.

TABLE 1

| Steel No. | C | N % | Mo | V | Cr | Mn | Si | |
|---|---|---|---|---|---|---|---|---|
| A | 0.15 | 0.4 | 1 | 0.4 | 15 | | | |
| B | 0.4 | 0.2 | 2 | 0.3 | 15.5 | | | |
| C | =0.4 | 0.3-0.9 | =3 | =1 | 12-18 | =1 | =1.5 | Nb + Ti = 0.5 |
| D | <0.15 | 0.4-0.8 | 0.2-4 | 0.02-0.20 | 12-18.5 | 0.1-2.0 | 0.1-1.0 | Nb 0.02-0.2 |

However, the carbon contributes positively to the hardness of the material, which means that the steel suitably can be allowed to contain a small amount of carbon. The most preferred range of carbon content depends on the specific application for the steel, that primarily is knives and tools, especially machine knives and manual knives within food industry, and the specific application should in turn, according to one aspect of the invention, bear a large significance on the choice of the most suited nitrogen content. Therefore, considering the most preferred range of carbon content, it is referred to the following discussion in connection with the nitrogen content of the steel.

In order to obtain amongst other things good corrosion properties, a comparatively large amount of nitrogen has been added to the steel. Nitrogen contributes to a uniform distribution of chromium in the austenite, and contributes to a better corrosion resistance by effectively preventing grain boundary precipitation in favour of precipitation of very small, uniformly distributed secondary particles of $M_2N$ nitride, where M mainly represent chromium but also molybdenum.

Nitrogen also contributes to the achieving of an adequate hardness in the material, despite the low carbon content. The hardness-increasing effect of nitrogen probably depends on the above described precipitation of $M_2N$ carbides. In addition to chromium and molybdenum the metals iron, niobium and vanadium form small nitride particles. Furthermore, the elements nitrogen, carbon, chromium and molybdenum contribute to the hardness of the martensite, by solution hardening. Accordingly and preferably, the steel contains 0.80-0.95% nitrogen. The nominal nitrogen content is about 0.9%.

A for the invention suitable relation between carbon and nitrogen has in laboratory tests been shown to be a nitrogen to carbon relation of about 9:1. The total amount of carbon in the steel, i.e. carbon being dissolved in the matrix of the steel plus the carbon that is bound in carbides, should not exceed 0.12%, preferably being 0.11% at the most and suitably being in the range of 0.02-0.10%. Suitably, the average composition of the steel comprises about 0.08% carbon. Then, a suitable nitrogen content is about 0.9%, but in the laboratory charges that have been produced for development purposes, both carbon and nitrogen contents have been varied and it is clear from tests further below, that desirable properties can be achieved with a nitrogen content in the range of 0.5-1.5, suitably 0.7-1.2 and preferably 0.8-1.0%. This leads to that the relation between nitrogen and carbon in the steel can lie in the range of 4:1-75:1, suitably 6:1-50:1, and preferably about 9:1.

Silicon is included as a residue from the manufacturing of the steel, and exists at a content of at least 0.1%. Silicon increases the carbon activity in the steel, and accordingly it may contribute to an adequate hardness of the steel without giving brittleness problems. However, silicon is a strong ferrite former and lowers the range of the hardening temperature, and accordingly it may not exist in contents above 0.5%. The nominal silicon content is about 0.2%.

Manganese also exists as a residue from the manufacturing of the steel, and it binds the amounts of sulphur that may exist in low contents in the steel, by forming manganese sulphide. Manganese also promotes hardenability, which is favourable. However, as an austenite former manganese is not desirable in the steel according to the invention, which means that the manganese content most desirably should be less than 0.5%, preferably less than 0.4% and suitably less than 0.3%. The nominal manganese content is about 0.3%.

Chromium is an important nitride former, and together with nitrogen it forms chromium nitrides ($Cr_2N$). These will give a steel with improved corrosion properties and a martensite that has unusually high hardness considering its stainless properties. The chromium nitrides also contribute to the desired wear resistance of the material. Chromium can also contribute to an increased hardness and a decreased rate of corrosion of the martensite, by solution hardening. Therefore, chromium should exist at a content of at least 12%, preferably at least 12.5% and suitably at least 13%, in order to give the steel a desired corrosion resistance. However, chromium is a strong ferrite fonner, and in order to avoid ferrite after hardening from 1050-1150° C., the chromium content should not be more than 18%, preferably not more than 17% and suitably not more than 16%. The nominal chromium content is about 14.5%.

As it is an austenite stabilising compound, nickel is not desired in the steel according to the invention. However, nickel can be tolerated as an unavoidable contamination, which as such can be as high as about 0.5%. Preferably, the nickel content is less than 0.4%. The nominal nickel content is about 0.3%.

Cobalt is an optional compound, and as such it may optionally be included at a content of 2% at the most, in order to further enhance the hardness by accelerating the conversion of residue austenite to martensite, and to a certain extent contribute by solution hardening. Normally, no addition of cobalt is however necessary in order to reach the desired properties of the steel. Therefore, cobalt may be allowed to exist in the steel as a contamination at a content of up to 0.5%, emanating from raw materials included in the manufacturing of the steel.

Molybdenum should exist in the steel in order to give it a desired corrosion resistance, in particular a good resistance against pit corrosion, and a good hardenability. Molyb-denum is also a valuable nitride former. In its property of being a nitride former, molyb-denum may however principally be replaced by the double amount of tungsten. Accordingly, the total content of Mo+W/2 in the steel should be not less than 1%, preferably at least 2%, suitably at least 2.5%. However, molybdenum and tungsten are strong ferrite formers, which means that the steel should not contain more than 5% at the most, preferably 4% at the most, suitably 3.5% at the most of (Mo+W/2). The nominal content of (Mo+W/2) is 3.0%.

However, tungsten does not give the same improvement in corrosion resistance and hardenability as molybdenum does. Moreover, due to atom weight relations, twice the amount of tungsten is required to replace molybdenum. Another disadvantage of tungsten is that scrap handling is rendered more difficult, i.e. the utilisation of residual products (scrap) that arise at the manufacturing of the steel and the processing into a final product. Therefore, in a preferred embodiment of the invention, the steel should not comprise any deliberately added tungsten, but it may be tolerated as an unavoidable contamination in the form of residual elements from raw materials included in the manufacturing of the steel.

Vanadium should be included in the steel, in order together with nitrogen and any existing carbon to form M(N,C)-nitrides, -carbides and/or -carbonitrides in the martensite matrix of the steel at hardened and tempered condition. Niobium is an element that has a strong tendency to form M(N, C)-nitrides, -carbides and/or -carbonitrides, and it exists both as primary precipitated particles and smaller secondary precipitated particles. Primary precipitated M(N,C)-nitrides, -carbides and/or -carbonitrides containing niobium are of considerably smaller size, <0.5 µm, than M(N,C)-nitrides, -carbides and/or -carbonitrides without niobium, which have the size of about 1 µm. The niobium compounds may contribute to keeping down the grain size of the material, and give a better hardness of the material at about equal toughness. Together with vanadium, niobium contributes to an improved wear resistance, why the steel preferably should comprise both of these two alloying materials. Titanium may also form M(N,C)-nitrides, -carbides and/or -carbonitrides, and contributes to the hardness of the material by precipitation of primary and secondary particles. In a preferred embodiment, the steel does however not comprise any deliberately added amount of titanium. The total content of (V+Nb/2+Ti) in the steel should be a content of 1.5% at the most, preferably 0.35-1.0%, suitably about 0.6%, whereof a maximum of 1.0%, preferably 0.3-0.7%, suitably about 0.5% is Nb, and a maximum of 0.5%, preferably 0.05-0.3%, suitably about 0.1% is V. The nominal content of (V+Nb/2) is about 0.6%.

Besides the alloy materials mentioned, the steel need not, and should not, comprise any additional alloy elements in significant amounts. Some materials are explicitly un-wanted, since they affect the properties of the steel in an undesired manner. This is true for example for phosphor, which should be kept at the lowest possible level, preferably 0.05% at the most, most preferred 0.03% at the most, in order not to negatively affect the toughness of the steel. Sulphur is also an undesired element that among other things impairs corrosion resistance. Its negative effect, primarily on toughness, can be considerably neutralised by aid of manganese, that forms essentially harmless manganese sulphides. Preferably however, the steel comprises normally not more than 0.1% S at the most.

A preferred nominal composition of the steel of the invention is given below, in Table 2. The steel is intended primarily to be used for knives and tools, especially machine knives and manual knives within food industry, according to the above. Other conceivable applications are plastics moulding tools and injection screws for plastics, tools for cutting paper based laminated packaging products for food and beverages. Another conceivable field of application is as a material for ball bearings.

TABLE 2

Nominal chemical composition in % by weight, balance Fe and impurities other than the ones given in the table.

| C | N | Si | Mn | Cr | Mo | V | Nb | P | S | Ni |
|---|---|---|---|---|---|---|---|---|---|---|
| 0.08 | 0.9 | 0.2 | 0.3 | 14.5 | 3.0 | 0.1 | 0.5 | <.05 | <.1 | 0.3 |

The manufacturing of the steel material comprises preferably powder metallurgical manufacturing of a steel powder, by gas atomisation with nitrogen according to the well known ASP process (the ASEA-STORA process), including ESH refining, that stands for Electro Slag Heating and that gives an extremely homogeneous steel powder with a very low content of slag inclusions. The invention however also comprises manufacturing of a steel according to the invention by other closely related manufacturing methods, such as spray forming.

The powder metallurgically manufactured steel powder is sieved to a particle size of 500 μm at the most, and a certain amount of this is nitrified to an adequate nitrogen content, such as 1-5%, at a temperature of between 550 and 600° C. and in an atmosphere consisting of a mixture of ammonia gas and nitrogen gas. The steel powder with a high nitrogen content is then mixed with the rest of the non-nitrified steel powder having a lower nitrogen content, according to a special and accurate procedure, and is then filled into a capsule that is evacuated from air. The capsule is filled with inert nitrogen gas and is sealed by air tight welding, where after the capsule is compacted by hot isostatic pressing (HIP), to form a homogeneous steel ingot. In an alternative procedure, the entire amount of sieved steel powder is nitrified to an adequate nitrogen content, in which case the mixing procedure can be dispensed with. Thereafter, the material is hot-worked into bars or strips, where after it is soft annealed so that the steel according to the invention gets a hardness of 220-250 HB (Brinell-hardness number), preferably 230-240 HB.

The steel is delivered as hot- and cold-worked steel strips. After machining to a desired shape, especially the shape of machine knives and manual knives for use within food industry and pharmaceutical industry, or for plastic moulding tools and injection screws for plastics, tools for cutting paper based laminated products for food and beverages, and for ball bearings, the product is heat treated by austenitizing at a temperature of between 1000 and 1200° C., preferably at a temperature of between 1050 and 1150° C., most preferred at a temperature of between 1100 and 1150° C. A suitable holding time at the austenitizing temperature is 10-30 min. From the mentioned austenitizing temperature, the steel is cooled by deep cooling down to −80-−200° C., in order to eliminate residual austenite. To achieve a desired secondary hardening, the product is tempered at least twice at a temperature of between 400 and 600° C., preferably at a temperature of between 460 and 520° C. After each such tempering treatment, the product is cooled, suitably to about room temperature. The holding time at tempering temperature can be 1-10 h, suitably about 1 h.

Other characteristics and aspects of the invention are clear from the appended claims, and from the following account of tests that have been made.

BRIEF DESCRIPTION OF THE DRAWINGS

In the following account of tests that have been made, it is referred to the appended drawings, of which.

EXAMPLES

Figure 1:
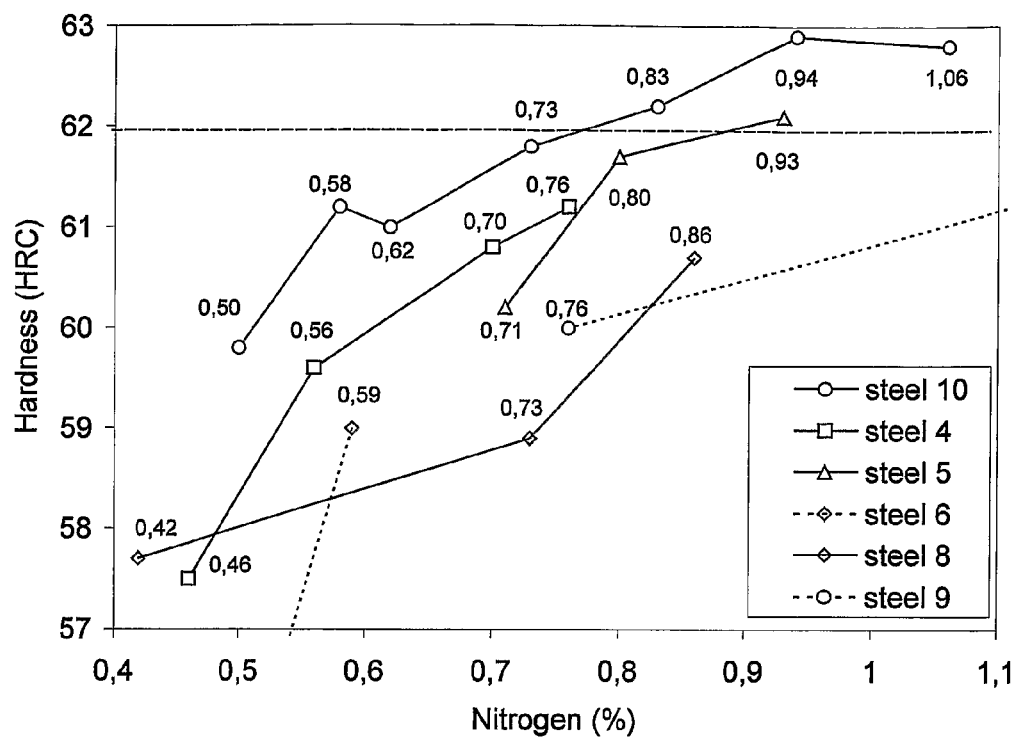
FIG. 1 shows a graph over the effect of nitrogen content in the material on hardness, in six sample alloys.

A number of steel alloys were manufactured as laboratory charges, and from these HIP:ed steel capsules, Ø30×100 mm, have subsequently been made according to the manufacturing procedure described above. Each capsule has been divided into smaller parts and been analysed in respect of included elements. Table 3 shows compositions for these laboratory charges. The different materials have furthermore been examined in respect of hardness, corrosion resistance and hot ductility, in order to find the best possible composition.

The wear resistance of the steel will be examined as a knife test, after manufacturing of the strip material intended for knives. This strip material is suitably manufactured of steel from a full scale charge, which as opposed to steels from laboratory charges results in a material with a negligible slag content. A low slag content gives the best possible conditions for just results both from knife tests and from mechanical testing of the strength of the steel. With a point of departure from tests of laboratory charges, concerning the chemical composition of the steel, thermodynamic calculations of the steel composition of chemical phases, among others of the hard nitride phases, M(N,C) and $Cr_2N$, metallographic examination of the portion, i.e. size and number, of hard phase particles of the nitride phases, and not the least the high hardness of the steel, it may however be asserted that the material most likely will fulfil the requirements on wear resistance.

TABLE 3

| Alloy No. | C | N | Si | Mn | Cr | Mo | V | Nb | Co weight % |
|---|---|---|---|---|---|---|---|---|---|
| 1 | 0.09 | 0.74 | 0.09 | 0.15 | 15.0 | 3.1 | 0.10 | 0.3 | — |
| 2 | 0.08 | 0.92 | 0.10 | 0.21 | 15.2 | 3.2 | 0.97 | 0.45 | — |
| 3 | 0.08 | 0.73 | 0.26 | 0.29 | 15.0 | 3.05 | 0.03 | 0.48 | — |
| 4-1 | 0.08 | 076 | 0.44 | 0.43 | 15.8 | 3.03 | 0.62 | — | — |
| 4-2 | " | 0.70 | " | " | " | " | " | — | — |
| 5-1 | 0.11 | 0.93 | 0.46 | 0.4 | 15.2 | 3.02 | 1.05 | — | — |
| 5-2 | " | 0.80 | " | " | " | " | " | — | — |
| 6-1 | 0.08 | 0.59 | 0.4 | 0.47 | 15.1 | 3.99 | 0.61 | — | — |
| 6-2 | " | 0.49 | " | " | " | " | " | — | — |
| 7-1 | 0.08 | 0.52 | 0.44 | 0.53 | 15.5 | 4.99 | 0.61 | — | — |
| 7-2 | " | 0.4 | " | " | " | " | " | — | — |
| 8-1 | 0.09 | 0.86 | 0.35 | 0.46 | 15.1 | 3.01 | 0.63 | — | 8.0 |
| 8-2 | " | 0.76 | " | " | " | " | " | — | " |
| 9-1 | 0.09 | 0.78 | 0.91 | 0.52 | 15.7 | 3.09 | 0.71 | — | — |
| 9-2 | " | 0.53 | " | " | " | " | " | — | — |
| 10-1 | 0.08 | 0.94 | 0.20 | 0.29 | 14.5 | 3.05 | 0.12 | 0.52 | — |
| 10-2 | " | 0.83 | " | " | " | " | " | " | — |
| 10-3 | " | 0.58 | " | " | " | " | " | " | — |

In the produced laboratory charges, the carbon content has constantly been kept at a level of about 0.08% by weight, and in a couple of cases at 0.11% by weight. The nitrogen content has been varied between 0.4 and 0.94% by weight. The amounts of the alloy materials molybdenum, vanadium, niobium and silicon have been varied in these charges. In one case, cobalt has been added. The most important result from these comparatively small variations in composition has been restricted to a variation in mechanical properties, especially concerning the hardness of the steel.

Microstructure

Figure 2:
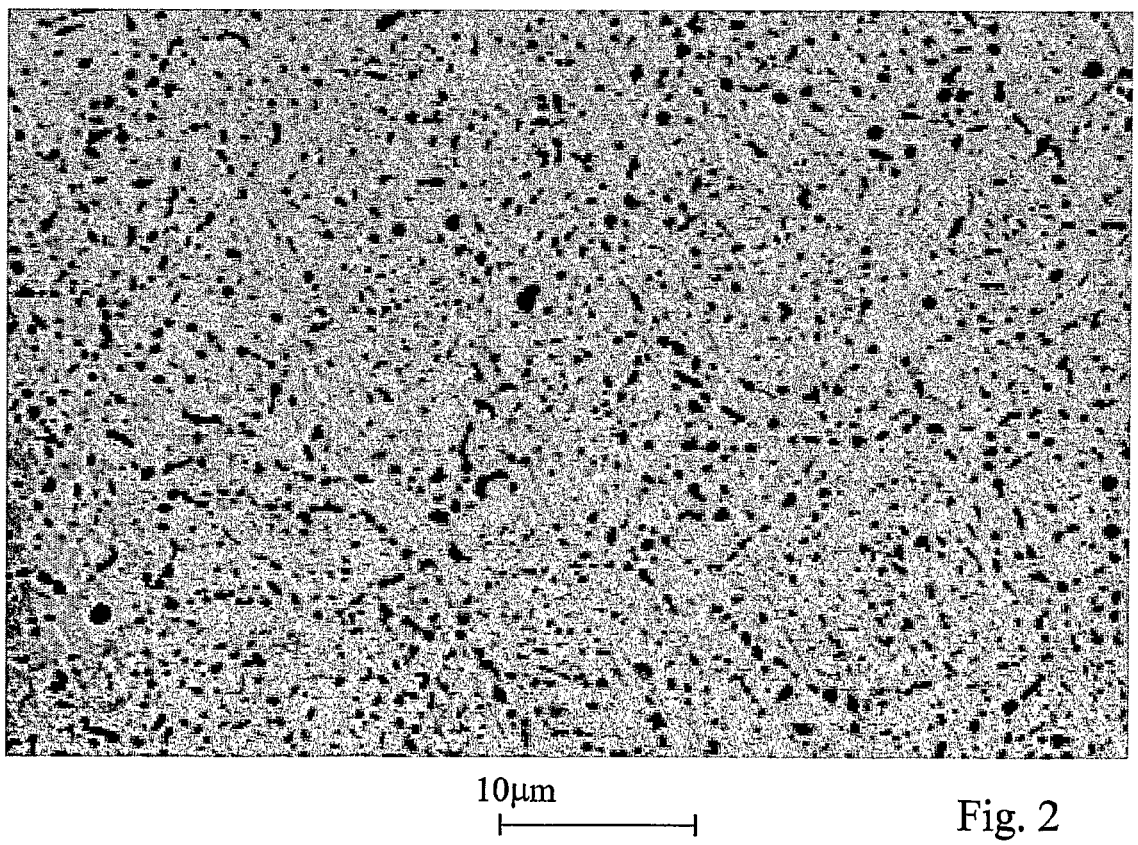
FIG. 2 shows the microstructure of a steel according to the invention, in a magnification of ×2000.

The hardened and tempered steel has a microstructure essentially consisting of two different hard phases in a matrix of nitrogen martensite. Referring to FIG. 2, the micro-structure of a steel according to the invention will be described, having a nominal composition corresponding to steel no. 10-1 in table 3. The steel according to the invention has been subjected to a heat treatment comprising austenitizing at 1100° C., deep cooling at −196° C. and 3×1 hour tempering at 460° C. The microstructure is very fine and the difference in contrast of the phases is small, which means that it is harder to depict clearly, than is common ASP-steel.

Matrix Phase

Depending on hardening temperature, 94-97% of the steel is so called nitrogen marten-site, which is a martensite in which carbon in the main has been replaced by nitrogen. The chemical content is, besides iron, essentially chromium, molybdenum and nitrogen, and resembles the average composition of the alloy, with exception however for nitrogen, niobium and vanadium, the contents of which are lower. All of these materials have more or less influence on the hardness of the matrix phase.

This nitrogen martensite is unusually hard for having stainless properties. The Vickers hardness has been measured to HV 600-700, which is reached by precipitation-/secondary hardening of very small secondary particles. Probably, these small particles have a size similar to those of high speed steel, and then their size is 5-20 nm. Moreover, solution hardening from the materials nitrogen, carbon, chromium and molybdenum, may contribute to the hardness of the nitrogen martensite.

The nitrogen martensite also contains 3-6% by weight of primary precipitated hard phase particles. These hard phase primary particles are much larger, 100-500 nm, than the secondary particles.

The nitrogen martensite also contains 5-20% residual austenite. The portion of this phase should be low, since the residual austenite is soft. It is tried to decrease the portion of residual austenite by repeated tempering and/or deep cooling at low temperature, for example in liquid nitrogen. Tests have however shown that for the material according to the invention, an adequate hardness, >62 HRC, can be achieved already after two tempering treatments, and that addition tempering treatments only have a very marginal affect the hardness.

The Hard Phases

In FIG. 2, very small and light particles of M(N,C) appear, which is the hardest phase having a measured Vickers hardness of HV 2000-3000. The particles have a size of normally smaller than 0.5 μm. This hard phase contains essentially chromium, niobium, some vanadium and molybdenum, and in addition a lot of nitrogen. The carbon content is nearly negligible. The proportion of the alloy materials in this hard phase, can be described according to the following:

(Cr 0.66, Nb 0.27, V 0.07, Mo ~0)(N 0.98 C 0.02)

Niobium is included in the M(N,C)-particles, both as larger primary and as small secondary particles (during precipitation hardening), as well as vanadium. The niobium compound, that is more difficultly soluble at hardening temperature that is the corresponding compound with vanadium, also has the advantage that it prevents grain growth in the austenite phase.

$Cr_2N$ is also harder than the matrix phase, (HV 1200-1600), but not as hard as M(N,C). In FIG. 2, $Cr_2N$ appears as dark grey particles having a size that normally is 0.2-1.0 μm. It contains essentially chromium and in dropping amounts, iron and vanadium, according to the following proportions:

$(Cr\ 0.79,\ Mo\ 0.07,\ Fe\ 0.09,\ V\ 0.05)_2\ (N\ 0.98\ C\ 0.02)$

Given that the carbon content is in the main negligible, this phase is simply denoted $Cr_2N$.

In FIG. 2, the M(N,C)-particles are light grey, and they exist in the material to an amount of 1.5-2.0%. The $Cr_2N$-particles are dark grey, and they exist in an amount of 4-1.5%, depending on the austenitizing temperature, within the range of 1100-1150° C. Accordingly, the content of $Cr_2N$ (4%) is larger than the content of M(N,C), in the Figure, due to the lower austenitizing temperature.

According to the above, it is in particular the amount of $Cr_2N$ that is affected by the austenitizing temperature. The tempering affects the hardness of the matrix phase, but also its corrosion resistance, such that a high tempering temperature gives a higher hardness but an impaired corrosion resistance. Based on results from undertaken tests, the tempering temperature has been limited to 450-500° C., in order to obtain the desired properties. The steel according to the invention has been subjected to a heat treatment comprising austenitizing at 1100° C., deep cooling at −196° C. and 3×1 hour tempering at 460° C.

Hardness

In hardened and tempered condition, the hardness of the steel according to the invention should be 58-65 HRC, preferably 60-64 HRC, and most preferred the hardness should be in the range of 62-63 HRC. The hardness that is achieved depends on the choice of hardening temperature, whether the material is subjected to deep cooling or not, and the choice of tempering temperature. Deep cooling essentially eliminates the presence of residual austenite, which gives a desired hardness. If deep cooling is excluded, the hardness will be 1-1.5 HRC-units lower than if deep cooling is applied.

Furthermore, the hardness of the material depends on the content of included alloy materials, as is described above. Primarily nitrogen has been shown to have a large impact on the hardness of the material, by the formation of nitrogen martensite and hard phase particles. A number of the produced laboratory charges, having compositions according to table 3, were tested in respect of Rockwell hardness (HRC), and the result is shown in the graph of FIG. 1. It is evident that a higher nitrogen content contributes to a higher hardness of the material.

Corrosion Resistance

The corrosion resistance depends on the amount of the alloy materials nitrogen, chromium and molybdenum, that are dissolved in the matrix of the steel, but is negatively affected by an increased content of carbon. One way of expressing the corrosion resistance, in particular the level of protection against pit corrosion that is the most severe type of corrosion, is by the so called PREN number, which is obtained by the following calculation. Cr+3.3Mo+16N (% by weight). Table 4 shows a comparison between some commercial steels (A, B, E) and a steel according to the invention, in which the hardness and PREN numbers of the materials are shown.

TABLE 4

| Type of steel | C | N | Cr | Mo | V | X | HCR/tempering temp. (° C.) | PREN number |
|---|---|---|---|---|---|---|---|---|
| A | 0.3 | 0.4 | 15 | 1 | 0.5 | | 59/150 alt.500 | 25 |
| B | 0.4 | 0.2 | 15.5 | 2 | 0.3 | | 57-59/180 alt.500 | 25 |
| E | 0.05 | | 12.7 | 0.1 | | Ni = 8 Al = 1 | 47/450 | 24 |
| 10-1 | 0.08 | 0.9 | 14.5 | 3 | 0.1 | Nb = 0.5 | >62/500 | 39 |

A number of the produced laboratory charges were examined according to two different test methods, in order to determine their corrosion properties. One of the test methods aims at determining the resistance of the material against pit corrosion, and is defined in standard EN ISO 8442.2. Those tests have been performed at the Swedish Corrosion Institute. The second test method aims at determining the resistance of the material against intercrystalline corrosion, also called intergranular corrosion, and is denoted Electrochemical Potentiokinetic Reactivation (EPR). Those tests have been performed at Aubert&Duval. One important aspect in this connection is that the inventive steel is intended to be tempered at a temperature of between 400 and 560° C. This gives a great advantage to the mechanical properties of the steel, i.e. a high hardness and dimensional stability, within a broad temperature range of up to tempering temperature. At the same time, the high tempering leads to a higher impact on the corrosion resistance of the steel. Therefore, most of the competitive materials are low tempered in order to withstand the corrosion tests.

EN ISO 8442.2

According to one aspect of the invention, it is desirable that the material has a corrosion resistance that fulfils the requirements of test method EN ISO 8442-2. This test method is intended for testing materials that get in contact with food, especially cutting tools and kitchen tools that risk to be subjected to pit corrosion at contact with chloride-containing water. Seven of the produced laboratory charges were produced in 2-4 different variants, having varying nitrogen contents. The tests were subjected to the following heat treatment before testing. Austenitizing at 1100° C., deep cooling in liquid nitrogen at −196° C., 3×1 h tempering at 460° C. In this corrosion test, the series of alloys denoted 10-1, 10-2 and 10-3 have been tempered at a higher temperature than the other materials, 3×1 h at 500° C.

In order to be approved, it is required that the material has no more than 3 spots with a diameter of between 0.4 and 0.75 mm, and not more than 1 spot with a diameter over 0.75 mm, per 20 cm$^2$. All materials passed the test, in the form of double samples, but some of the samples having the lower nitrogen contents displayed a slight discoloration due to corrosion in areas around large slag inclusions. Comparative tests were made on a commercial martensite stainless steel, here denoted F. The composition of the material is shown in Table 5. Two samples were tested of this material. Both samples were austenitized at 1050° C., but one of them was tempered at high temperature ($F_{HT}$) and the other was tempered at low temperature ($F_{LT}$). None of the samples passed the test. Table 6 below shows the results for a choice of the tested materials.

TABLE 5

| Composition of steel F | | | | | | |
|---|---|---|---|---|---|---|
| Material | C | Si | Mn | Cr | Mo | V |
| F | 1.05 | 0.3 | 0.5 | 14.5 | 4 | 0.2 |

TABLE 6

| Result of corrosion test according to EN ISO 8422.2 | | |
|---|---|---|
| Material | Spots > 0.4 mm | Spots > 0.75 mm |
| 10-1 | No | No |
| 10-2 | No | No |
| 10-3 | No | No |
| 1-1 | No | No |
| 2-1 | No | No |
| $F_{LT}$ | Many | A few |
| $F_{HT}$ | Many | A few |

Electrochemical Potentiokinetic Reactivation (EPR)

The resistance of the laboratory charges against intercrystalline corrosion has been examined by an electrochemical testing method called Electrochemical Potentiometric Reactivation (EPR). By aid of the EPR method, the corrosion resistance of the material can be determined, both in matrix and grain boundaries. Intercrystalline corrosion is very severe to the hardness of the material, and appears due to precipitation of chromium carbide in the grain boundaries during tempering of the hardened material. This causes depletion of chromium in material neighbouring areas around the grain boundaries, and thereby the material is sensitized to corrosion attacks.

Figure 3A:
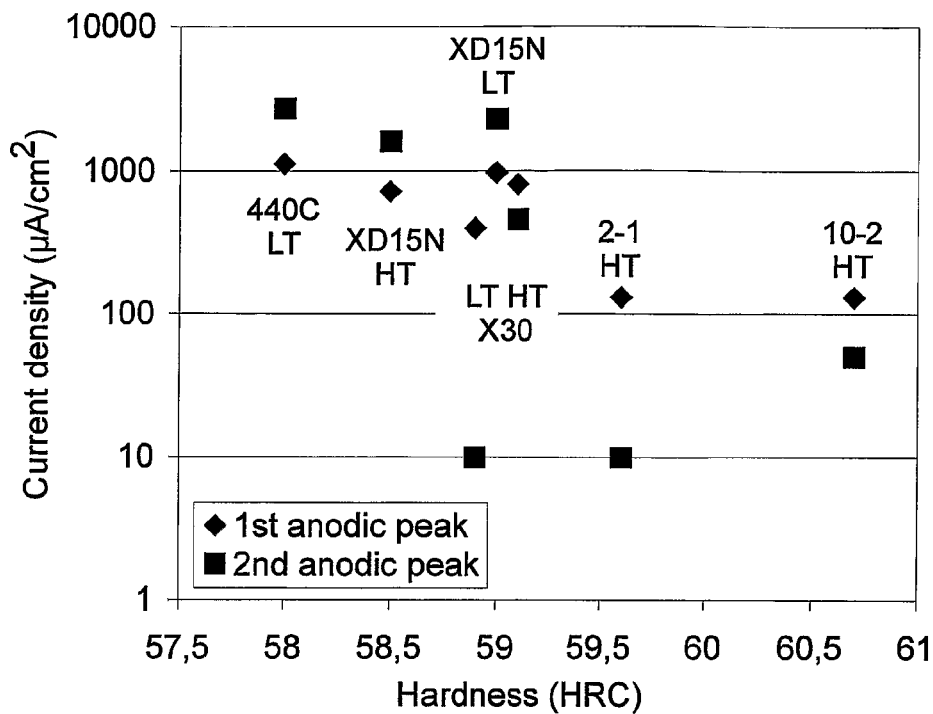
FIG. 3a shows a graph over the result at EPR testing with anodic polarisation.
Figure 3B:
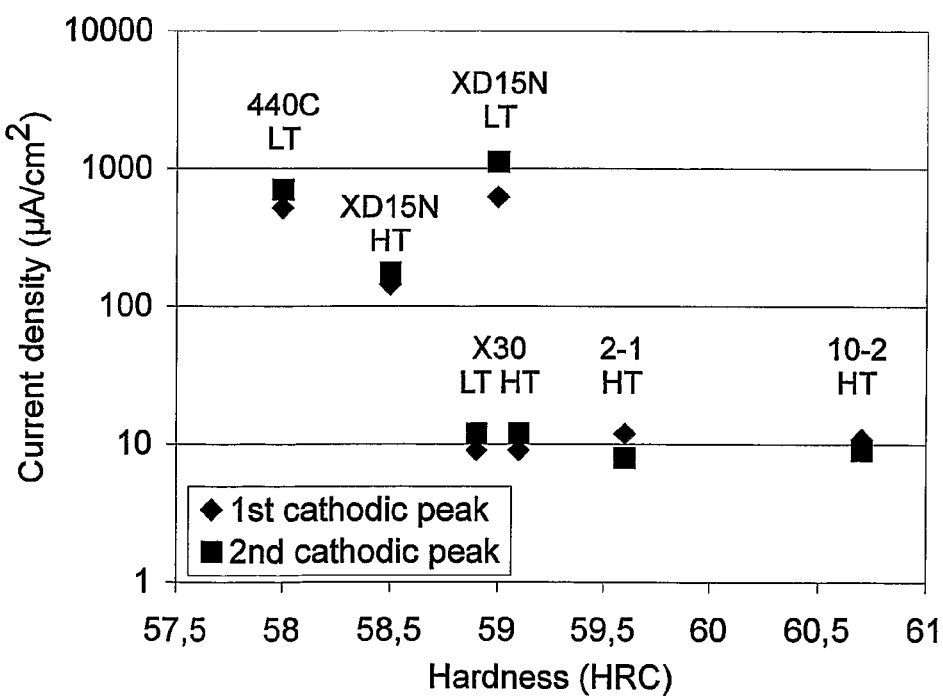
FIG. 3b shows a graph over the result at EPR testing with cathodic polarisation.

The result from this examination is shown in FIGS. 3a and 3b, and shows among other things the following in comparison with other high temperature tempered ($_{HT}$) and low temperature ($_{LT}$) reference materials, respectively:

Absence of initiated intergranular corrosion mechanism.

A very low dissolution of matrix in 1% sulphuric acid in presence of the oxygen of the air.

In the Figures, the measured current density in the examination is shown in relation to the hardness of the material. A low current density corresponds to a high corrosion resistance, and the material according to the invention has the best result of the tested materials.

Moreover, the examination most surprisingly showed that the passivation is strengthened at repeated potential cycles, which is seen in the Figures as the second current peak having a lower value than the first current peak. In FIG. 3a (anodic polarisation), similar results are achieved for the reference material that is denoted A, but in FIG. 3b (cathodic polarisation) this material also exhibits impaired corrosion properties at the second current peak. This is especially interesting as the reference material has 0.4% by weight nitrogen, and thereby could be expected to react in a similar way as materials 2-1 and 10-1 according to the invention. Moreover, material A has a worse hardness than the two materials according to the invention.

Accordingly, the examination shows that the stainless knife steel according to the invention has the best combination of hardness and corrosion resistance, in comparison with the other examined high- and low-temperature tempered reference steels.

TABLE 7

Current density ($\mu$A/cm$^2$) at the 450 mV peak.

| Type of steel | Heat treatment austenitizing temp./ hardening/tempering | Anodic polarisation | Cathodic polarisation |
| --- | --- | --- | --- |
| 10-1 | 1100° C./deep cooling/ | 130 (1$^{st}$) | ≦10 (1$^{st}$) |
|  | 3 × 1 h at 460° C. | 50 (2$^{nd}$) | ≦10 (2$^{nd}$) |
| 2-1 | 1100° C./deep cooling/ | 130 (1$^{st}$) | ≦10 (1$^{st}$) |
|  | 3 × 1 h at 460° C. | 10 (2$^{nd}$) | ≦10 (2$^{nd}$) |
| A$_{LT}$ | 1025° C./oil quenching/2 h at | 800 (1$^{st}$) | ≦10 (1$^{st}$) |
|  | 150° C. | 460 (2$^{nd}$) | ≦10 (2$^{nd}$) |
| A$_{HT}$ | 1025° C./oil quenching/2 h at | 960 (1$^{st}$) | 630 (1$^{st}$) |
|  | 500° C. | 2280 (2$^{nd}$) | 1120 (2$^{nd}$) |
| B$_{LT}$ | 1050° C./oil quenching/2 h at | 400 (1$^{st}$) | ≦10 (1$^{st}$) |
|  | 180° C. | ≦10 (2$^{nd}$) | ≦10 (2$^{nd}$) |
| B$_{HT}$ | 1050° C./oil quenching/2 h at | 720 (1$^{st}$) | 160 (1$^{st}$) |
|  | 500° C. | 1600 (2$^{nd}$) | 160 (2$^{nd}$) |
| G$_{LT}$ | 1050° C./oil quenching/2 h at | 1110 (1$^{st}$) | 520 (1$^{st}$) |
|  | 160° C. | 2700 (2$^{nd}$) | 700 (2$^{nd}$) |

The polarisation has been measured for two cycles, in order to investigate if the passivation was strengthened or impaired. If the second value is the lowest, the passivation was strengthened.

Hot Ductility

Figure 4:
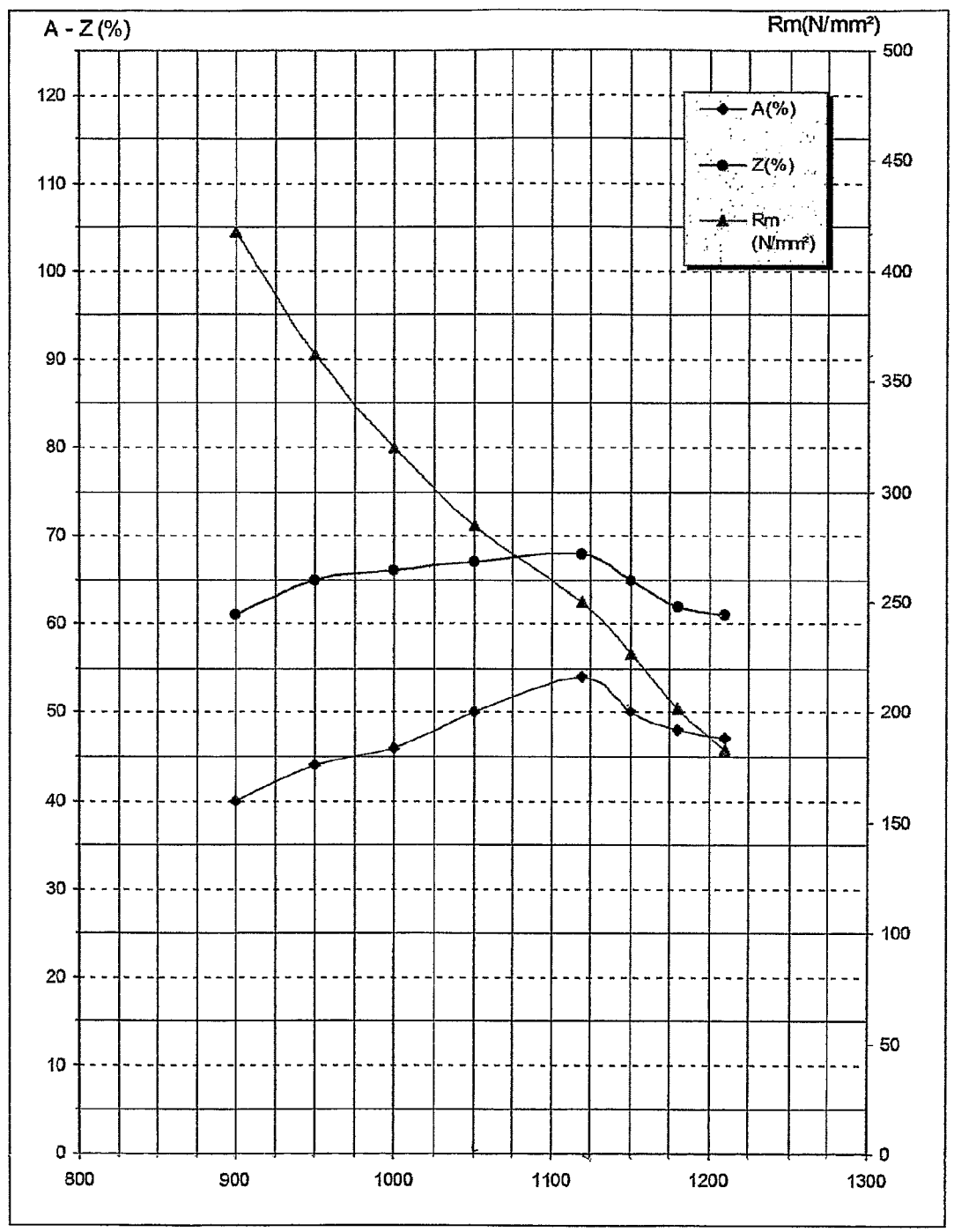
FIG. 4 shows a graph over hot ductility in a material according to the invention.

The hot ductility of material 10-1, within the temperature range 900-1210° C., is shown in FIG. 4. Test dimension Ø15×85 mm, rate of elongation 6.6 s$^{-1}$, increasing temperature for T≧1120° C. and decreasing temperature for T≦1120° C.

The invention claimed is:

1. A powder metallurgically manufactured corrosion resistant steel material which is an alloy of the following composition in % by weight:
   max 0.12 C
   0.5-1.5 N
   12-18 Cr
   max 0.5 Mn
   max 0.5 Ni
   1.5(Mo+W/2)
   0.3-1.0 Nb
   max 1.5(V+Nb/2+Ti)
   0.1-0.5 Si
   from traces and up to max 2.0 Co
   from traces and up to max 0.1 S
   balance iron and incidental impurities and wherein the relation between nitrogen and carbon lies in the range of 4:1-75:1.

2. A steel material according to claim 1, wherein after hardening and tempering, it has a hardness of 58-65 HRC and a microstructure containing 3-6% by volume of two hard phases, one which is Cr$_2$N, in a matrix that essentially is constituted by tempered nitrogen martensite, which nitrogen martensite comprises residual austenite.

3. A steel material according to claim 1, wherein it contains max 0.11 C.

4. A steel material according to claim 1, wherein it contains 0.7-1.2 N.

5. A steel material according to claim 1, wherein it contains 12.5-17 Cr.

6. A steel material according to claim 1, wherein it contains max 0.4 Mn.

7. A steel material according to claim 1, wherein it contains max 0.4 Ni.

8. A steel material according to claim 1, wherein it contains 2-4 (Mo+W/2).

9. A steel material according to claim 1, wherein it contains 0.05-0.3 V.

10. A steel material according to claim 2, wherein it has been hardened by austenitizing at 1000-1200° C., deep cooled at −80 to −200° C., and thereafter tempered at a temperature of 400-560° C.

11. A steel material according to claim 10, wherein it has a hardness of 60-64 HRC.

12. A steel material according to claim 1, wherein it is soft annealed and wherein in the soft annealed condition it has a hardness of 220-250 HB (Brinell hardness).

13. A steel material according to claim 1, wherein it contains 0.020-0.10 C.

14. A steel material according to claim 1, wherein it contains 0.8-1.0 N.

15. A steel material according to claim 1, wherein it contains 13-16 Cr.

16. A steel material according to claim 1, wherein it contains max 0.3 Mn.

17. A steel material according to claim 1, wherein it contains max 0.3 Ni.

18. A steel material according to claim 1, wherein it contains 2.5-3.5 (Mo+W/2).

19. A steel material according to claim 1, wherein it contains 0.1 V.

20. A steel material according to claim 1, wherein it contains max 0.7 Nb.

21. A steel material according to claim 2, wherein it has a hardness of austenitizing at 1100-1150° C., deep cooled at −80–−200° C., and thereafter tempered at a temperature of 460-500° C.

22. A steel material according to claim 11, wherein it has a hardness of 62-63 HRC.

23. A steel material according to claim 12, wherein it has a hardness of 230-240 HB.

24. A knife or tool of steel material, wherein the steel material is the one defined in claim 1.

25. A machine knife or manual knife of steel material, wherein the steel material is the one defined in claim 1.

26. A plastic moulding tool or plastic injection screw of steel material, wherein the steel material is the one defined in claim 1.

27. A food and beverage packaging, paper based laminated product cutting tool of steel material, wherein the steel material is the one defined in claim 1.

28. A ball bearing of steel material, wherein the steel material is the one defined in claim 1.

* * * * *